(12) United States Patent
Horton (10) Patent No.: US 7,022,975 B2
(45) Date of Patent: Apr. 4, 2006

(54) ANGULAR POSITION SENSOR (75) Inventor: Steven John Horton, Shirley (GB)

(73) Assignee: TRW LucasVarity Electric Steering Limited, (GB)

( * ) Notice: Subject to any disclaimer, the term of this patent is extended or adjusted under 35 U.S.C. 154(b) by 42 days.

(21) Appl. No.: 10/846,480

(22) Filed: May 14, 2004

(65) Prior Publication Data

US 2005/0023451 A1   Feb. 3, 2005

Related U.S. Application Data

(63) Continuation of application No. PCT/GB02/05175, filed on Nov. 15, 2002.

(30) Foreign Application Priority Data

Nov. 16, 2001   (GB) ..................................... 0127491

(51) Int. Cl.
*G01D 5/34* (2006.01)
(52) U.S. Cl. .................. 250/231.14; 318/727
(58) Field of Classification Search ........... 250/231.13–231.18; 318/727
See application file for complete search history.

(56) References Cited

U.S. PATENT DOCUMENTS 6,329,782 B1 * 12/2001 Chen ........................ 318/727

FOREIGN PATENT DOCUMENTS

| EP | 0 154 654 | 9/1985 |
| EP | 1 041 364 | 10/2000 |
| GB | 2 134 341 | 8/1984 |
| JP | 9-126814 | 5/1997 |

\* cited by examiner

*Primary Examiner*—Thanh X. Luu
*Assistant Examiner*—Tony Ko
(74) *Attorney, Agent, or Firm*—MacMillan, Sobanski & Todd, LLC (57) ABSTRACT

An angular position sensor (1) suitable for use in combination with the rotor of an electric motor comprising both absolute and incremental encoders (3) where a first signal of the absolute encoder produces a period corresponding to an electric revolution of the motor and less than a mechanical revolution of the rotor, a second output of the incremental encoder varies periodically over a complete revolution of the rotor, where the two signals provide sufficient information to determine the absolute mechanical position of the rotor. Typically, transitions in the first output signal combined with the state of the second output signal provide such information. Also, an angular position sensor (1) comprising an encoder mask (6) with at least one annular track (7) and at least two detectors arranged to detect the elements of the tracks, the detectors arranged such that area swept across each detector by a radius of the encoder mask is the same for each detector as the encoder mask (6) is rotated about a point at the centre of the annular track.

39 Claims, 6 Drawing Sheets

Fig. 7(b) A5 Transition

Fig. 7(c) B1 Transition

Fig. 7(d) C9 Transition

Fig. 8

ANGULAR POSITION SENSOR

CROSS REFERENCE TO RELATED APPLICATIONS

This application is a continuation of International Application No. PCT/GB02/05175 filed Nov. 15, 2002, the disclosures of which are incorporated herein by reference, and which claimed priority to Great Britain Patent Application No. 0127491.9 filed Nov. 16, 2001, the disclosures of which are incorporated herein by reference.

BACKGROUND OF THE INVENTION

This invention relates to improvements in angular position sensors, and in particular to a rotary encoder suitable for determining the absolute angular position of the rotor of a brushless electrical motor over a complete mechanical revolution.

Angular position sensors—often referred to as rotary encoders—have a wide variety of applications although they are most often used to determine the angular position of the rotor of a motor. This positional information can be used in a control strategy for the motor. In many applications-including motors-the rotating shaft or rotor will make an almost unlimited number of revolutions during their working life. To allow for this most encoders are non-contact and employ an encoding mask fixed to the shaft which is sandwiched between at least one detector and a light source. The encoding mask carries at least one annular track of encoding elements which pass between the source and the detector to modulate the radiation reaching the detector.

Rotary encoders generally fall into one of two categories: absolute position encoders and relative position encoders. An absolute position encoder is a device capable of providing an output signal indicative of the angular position of the rotor to a limited angular resolution. These devices typically include more than one encoder tracks and the output is commonly an N-bit signal (N greater than one) with each bit or "channel" being obtained from a respective track on the encoder. The choice of pattern of the encoding elements in each track determines the value or "state" of the output signal at any angular position of the encoder. For example, to provide an output signal with 16 unique states requires 4 encoder tracks. Each output state corresponds to a range of angular positions of the rotor over a complete 360 degree revolution. In the example given with a 4-bit (16 state) output each state indicates that the rotor is within a particular 22.5-degree range (360/16 degrees). A key advantage of such a device is that a position value is obtained upon the instant that the device is switched on from the pattern of encoder elements between the source and the detector.

Relative encoders—sometimes referred to as incremental encoders, on the other hand, detect the position of the encoder disk relative to a datum by counting transitions between states, which occur as encoder elements pass between the source and the detector. In its purest form only a single track of encoder elements is required. The output will have only two states, and will repeat many times over one revolution. These devices typically offer a higher resolution than absolute position devices and are less expensive. A disadvantage over absolute encoders is that the position information is lost if power is removed from the counter and the encoder is rotated whilst power is switched off. When power is returned the position of the datum is unknown.

The most common form of incremental encoder is the quadrature encoder. This employs an encoding disk, which carries a single annular track of encoding elements. When rotated past two detectors the elements produce two quadrature (often sinusoidal) output signals that each vary periodically between one state and another over a revolution. One signal A leads the other B by ninety degrees. This type of device, which is well known in the art, has a relatively high resolution determined by the period of the encoding elements. It also allows the direction of travel of the rotor to be determined.

The applicant has proposed to use the output of an angular position sensor to provide an indication of the electrical angle of a multipolar motor. This can be used in order to control the commutation of the motor. For example, with a p=6 pole motor there are p/2=3 complete electrical revolutions per mechanical revolution of the rotor. The sequence of commutation of the motor windings is therefore repeated 3 times within each complete mechanical revolution. For motor control only the electrical commutation states need to be determined and an absolute encoder can therefore be provided which has an encoding pattern that repeats three times over a mechanical revolution. However, if an absolute measurement of mechanical position is required it becomes necessary to provide additional encoding tracks. For the example of a six pole motor a minimum of an additional two tracks are required to give sufficient values to uniquely identify all 18 commutation states. The need for the extra tracks simply to determine which electrical revolution the motor occupies is disadvantageous as it increases the complexity of the device.

SUMMARY OF THE INVENTION

It is an object of the present invention to provide an angular position sensor which provides both an absolute position signal over a complete mechanical revolution of a rotor whilst ameliorating the disadvantage associated with prior art relative and absolute encoder devices.

In accordance with a first aspect the invention provides an angular position sensor suitable for use in combination with the rotor of an electrical motor comprising:

an absolute angular position encoder having a plurality of tracks of encoder elements and producing a first output signal having a period corresponding to an electrical revolution of the motor and less than a mechanical revolution of the rotor, the output signal of the absolute position encoder changing state at a plurality of predetermined transition points within a period;

an incremental encoder having at least one track of encoder elements and producing a second output signal which varies periodically over a complete revolution of the rotor, and in which the two encoders are so constructed and arranged that the first output signal from the absolute encoder and the second output signal from the incremental encoder provide sufficient information to produce a third output signal indicative of the absolute mechanical position of the rotor.

The invention thus combines the outputs of both an incremental and an absolute position encoder to allow the absolute mechanical position of the motor (i.e. which electrical revolution it occupies) to be determined.

To produce the third-output signal the first output signal may be a multi-state signal and the two states of the first output signal either side of a transition in the first output signal combined with the state of the second output signal at the point of the transition may be arranged to provide a unique combination for every transition of the first output signal over a complete mechanical revolution.

For example, the first output signal may comprise a three channel signal with each channel being able to adopt one of two states such that a total of eight unique states can be represented across the three channels. The first output signal may cycle through all, or a subset of this total number of channels, across a single period which preferably corresponds to a complete electrical revolution of the motor. The pattern may be repeated for each electrical revolution in a complete mechanical revolution.

The state of the second output signal may be arranged to be the same immediately before and after a transition of the first output signal, i.e. transitions in the state of the first output signal and second output signal may be kept misaligned. Thus, in such a case, the second output signal should be arranged to have at least as many possible states as there are electrical revolutions of the motor across one full mechanical revolution.

For example, if the motor passes through three electrical revolutions in one complete mechanical revolution the second output signal should have at least three possible states.

One or both of the first and the second output signals may comprise digital signals, or other types of signals having stepped changes in value.

Most preferably the period of the second output signal of the incremental encoder is shorter than the period between transitions in the state of the output signal from the absolute position encoder. This is advantageous as it allows the output of the incremental encoder to be used to improve the angular resolution of the output signal from the absolute encoder. By period we may mean the angle of rotation across which the state of the second output signal passes through all its possible or chosen states before it repeats itself.

As stated hereinbefore, to enable the mechanical position to be determined the values or states of the absolute and incremental output signals around a step change in the output of the absolute position sensor must be unique for each transition. This can be achieved by the appropriate selection of the angular resolution of the incremental encoder and the relative alignment of the encoder tracks of the absolute and incremental encodes.

Each step change (transition) in the value (or state) of the output of the absolute encoder is preferably aligned with a respective commutation point of the motor. Thus, as a transition occurs a commutation of the motor may be affected. This requires that the output of the absolute encoder has enough different values or states across a period to uniquely identify each commutation point. Thus, the number of possible states of the output signal of the absolute encoder should be equal to or greater than the number of commutations over an electrical revolution.

In some instances, it may not be possible to provide a unique combination for the values from the absolute and incremental encoders at each transition with the transitions exactly aligned with the commutation points for the motor. In this case the angular position of the transitions steps in the state of the output of the absolute position sensor may be offset slightly relative to the commutation points to ensure that a unique combination of absolute and incremental encoder values occurs for each transition within a mechanical revolution.

For instance, in one arrangement it may be offset from the ideal positions by less than one period of the output of the incremental encoder. As all adopted states of the second output signal occur once in each period such a misalignment allows any state of the second output to be matched to a transition of the first output signal. Such a slight misalignment will not significantly affect the accuracy of the device as the output of the incremental encoder provides the high resolution needed and in any event the exact commutation point is not especially critical in most applications.

The absolute encoder may produce a multi-state output signal, in which the number of states of the signal over an electrical revolution is greater than or equal to the number of commutation points within one electrical revolution of the motor that is being monitored by the sensor. It may also have insufficient states to represent a unique value for every commutation within a complete mechanical revolution. For example, where the motor comprises a three-phase motor the absolute encoder may have three encoder tracks producing a three-bit output signal—each track corresponding to one bit of the output. This gives a maximum of eight possible states, which is sufficient to uniquely identify each of the six commutation points within a complete electrical revolution with two states being unused. A Gray code may be used for the output signal such that as the rotor rotates only one bit of the output changes at each transition across an electrical revolution.

The encoder tracks of each of the absolute and incremental encoders may comprise annular sets of encoding elements provided on a common encoding mask. The mask may comprise an opaque element such as a disk with each of the tracks on the encoding mask comprising sets of apertures or windows in the mask separated by opaque regions. Each aperture may be arcuate. The pattern for each of the absolute encoder tracks may be the same, with the apertures of one track out of phase with those of the remaining track.

Where the encoding elements comprise apertures or windows in an encoding mask a source of radiation may be provided on one side of the mask with a detector provided on the other side such that a region of the encoding track is interposed between the source and the detector.

In an alternative the encoding mask may comprise one or more tracks of reflective and non-reflective regions with the source and the detector located on the same side of the mask. As the encoding mask is rotated the elements of the tracks will sweep past the detectors.

At least one detector may be provided for each track of the mask. Each detector may produce an intermediate output signal. The intermediate output signals of two or more detectors may be combined to produce the first and/or second output signals.

Each track may comprise 2, or 4, or 8, or 16 or perhaps more equi-sized and spaced encoding elements. Each encoding element may comprise an arcuate element extending between two radii extended from the centre of the annular tracks.

The detectors may have a generally rectangular active area. The radial width of each detector may be at least equal to, and preferably greater than, the radial width of the encoding elements associated with that detector. This permits some run-out of the encoding mask without affecting the output of the detector.

For a robust system, it is still further preferred that two encoder tracks are provided for each bit of the output of the absolute encoder with a respective detector for each track, and in which the pattern of encoding elements of each of the pair of tracks produces a non-inverting and an inverting intermediate output signal from the detectors. As such the intermediate output signals of the detectors will be in anti-phase. The non-inverting and inverting intermediate output signals may be amplified, and the point at which the signal values cross may be detected using a voltage comparator to form a bit of the first output signal. This cross over point can be used to indicate the transition of the absolute encoder value. For example, for a three bit (or channel) first output signal, three pairs of detectors producing six intermediate output signals may be provided.

The incremental encoder may employ one or more encoding tracks, with at least two detectors arranged such that one produces a phase and the other a quadrature output signal as the encoder element rotates. It preferably comprises only a single track which may have 128 equi spaced apertures arranged around a circumference.

At least two detectors-providing a phase and a quadrature intermediate output signal may be provided which are associated with the single incremental encoder track.

Each of the phase and quadrature detectors may also be duplicated to produce non-inverting and inverting intermediate output signals. In this case the inverting and non-inverting intermediate output signals may be compared to give digital edge transition corresponding to the point at which the signals cross-over.

The width of the or each detector associated with the incremental track may be equal to the width of the incremental apertures so that each detector produces a triangular output signal waveform as the disk rotates at a constant speed.

The annular tracks of the absolute and incremental encoder may be arranged concentrically about the axis of rotation of the encoder mask. It is most preferred that they are defined on a common mask, although it may be possible to provide separate masks if desired.

The encoders are preferably both optical encoders. In this case the source may comprise a light source and each detector may comprise a photodetector. The photodetectors may be provided on a common substrate. They may, for example, be formed on a single piece of semi-conductor and this semi-conductor may also carry the processing circuitry used to produce the first and second output signals from the intermediate output signals produced by the detectors.

For correct functioning of the system it is important that the tracks of the absolute and relative encoder and their alignment relative to the detectors is adequately controlled. As stated hereinbefore it is relatively straightforward to ensure that the alignment of the tracks with each other is maintained by using a single encoder disk. A problem can occur, however, if the disk is not correctly centred about the rotor axis. A still further problem can occur if the detectors are misaligned in use or during manufacture.

If the detectors are subject to placement errors then there is a limit to the maximum error that can be tolerated if the correct electrical phase is to be identified.

In order to minimise the effects of misalignment of the detectors relative to the tracks it is proposed that the detectors are all mounted to common support or substrate. They may comprise silicon based photodetectors which may be fabricated on a single piece of silicon. Of course, other semiconductor materials could be used where appropriate and the invention is not to be limited to silicon detectors.

Many arrangements of encoder track on the encoder mask may be provided. For example, in a preferred arrangement it is proposed that the tracks of the absolute and the relative encoder comprise a plurality of concentric annular tracks of encoder elements arranged concentrically such that along a radius of the encoder mask the inverting and non-inverting tracks corresponding to each bit of the absolute encoder are provided on opposite sides of the or each track of the relative encoder. Thus, moving away from the axis of rotation there will be half of the absolute encoder tracks, followed by the incremental encoder track (or tracks) followed by the remaining half of the absolute encoder tracks.

Each of a pair of inverting tracks and the non-inverting tracks of the absolute encoder may be provided on opposite sides of the or each incremental encoder track.

For example, denoting each pair of absolute encoder tracks as A,B,C and a single incremental track Inc, the tracks may be labelled as $A_{inv}$, $A_{non-inv}$, $B_{inv}$, $B_{non-inv}$, $C_{inv}$, $C_{non-inv}$ and an incremental track INC the preferred order moving away from the centre of the mask may be:

$$C_{non-inv}, B_{non-inv}, A_{non-inv}, INC, A_{inv}, B_{inv}, C_{inv}$$

For the encoding regions of tracks at different radii to subtend identical angles in an inverting and non-inverting track they will have greater circumferential width as the radius of the tracks increases.

The detectors may therefore be so constructed and arranged that the fractional area swept across each detector by a region of the encoding disk is the same for each detector.

This can be achieved by making each detector subtend the same angle about the centre of the disk given that they have the same radial width. It is preferred that the distance from the central track to each of a pair of inverting and non-inverting tracks of a bit of the absolute encoder is approximately the same.

In a further refinement the detectors of a pair of non-inverting and inverting channels may be arranged so that for a given sensor array yaw angle the increase in the swept area of a detector of an inverting channel covered by one encoding element that partially covers that detector as a fraction of the total active area of that detector is the same as the decrease in swept area of the non-inverting channel covered by one encoding element that partially covers that detector as a fraction of the total active area of that detector.

This can be achieved through careful selection of the radial width of each detector and the length of the detectors. For example, the radial widths of the detectors the further they are from the axis of rotation of the encoding mask.

The active area of a detector associated with an encoder track may be different from the active area of a detector associated with a different one of the encoding tracks.

The aspect ratio of one or more of the detectors may therefore differ from that of one or more of the other detectors. Of course, if required the active area of all the detectors may be equal.

In a further refinement the gaps between the detectors may be at least twice the maximum expected run-out of the encoding disk or mask.

Provided that these requirements are satisfied the sensitivity of the device to yaw effects can be reduced.

It will, of course be appreciated that the advantages provided by careful selection of detector size and placement to reduce errors caused by misalignment of the detectors and/or mask run-out can be applied to any angular sensor arrangement in which annular tracks of encoding elements are provided.

Therefore, in accordance with a second aspect the invention provides an angular position sensor comprising:

an encoder mask having at least one annular track of encoder elements;
a first detector adapted to produce a non-inverting output signal which changes in value as the encoder elements of a track pass the detector;
a second detector adapted to produce an inverting output signal which changes in value as the encoder elements of a track pass the detector, the non-inverting output being an inverse of the inverting output signal; and in which the two detectors are so constructed and arranged that the fractional area swept across each detector by a radius of the encoder mask is the same for each detector as the encoder is rotated about a point at the centre of the annular track.

In this manner, and optionally through the use of detectors which have identical sensitivities for a given active area, the rate of change of the output of each detector as a transition from an encoder element edge sweeps across a detector can be made the same for both detectors. If more than two detectors are provided this can be extended to give an equal rate of change for all detectors if desired.

Additionally or alternatively, the non-inverting and inverting detectors may be arranged so that for a given yaw angle of the detectors relative to the encoder mask the increase in the swept area of the inverting detector covered by one encoding element that partially covers that detector as a fraction of the total active area of that detector is the same as the decrease in swept area of the non-inverting detector covered by one encoding element that partially covers that detector as a fraction of the total active area of that detector.

Again, this helps to ensure that any yaw of the detectors will have an equal and opposite effect on the output from each sensor. If the outputs are passed through a comparator these effects will cancel out.

For simplicity, each detector may have a generally rectangular active detecting area. The height (radially) of a detector may be less than the radial height of the encoding elements of the encoder track with which it corresponds.

The detectors may have increasing widths the further they are from the axis of rotation of the encoder.

If the widths are increasing with distance from the axis of rotation, then they may preferably have decreasing lengths moving away from the axis. This ensures that the change in area with yaw is minimised.

The radial spacing between the detectors may be at least twice the maximum expected run-out of the encoder.

In accordance with a third aspect the invention provides in combination an electric motor and an angular position sensor according to the first or second aspects of the invention which is adapted to measure the angular position of a rotor of the motor relative to a predetermined datum.

Other advantages of this invention will become apparent to those skilled in the art from the following detailed description of the preferred embodiment, when read in light of the accompanying drawings.

BRIEF DESCRIPTION OF THE DRAWINGS

FIG. 7(*a*) is a plot of each of the output signals from the detectors against angular position of the mask over a complete mechanical revolution; whilst FIGS. 7(*b*) to (*d*) illustrate the state of the absolute and incremental encoders for three typical transitions.

DETAILED DESCRIPTION OF THE INVENTION

Figure 1:
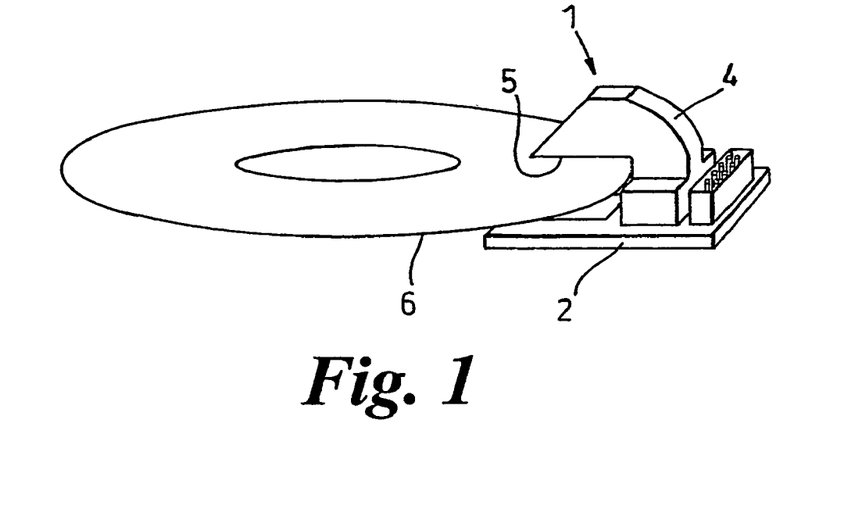
FIG. 1 is an isometric view of a portion of an angular position sensor in accordance with the present invention.
Figure 2:
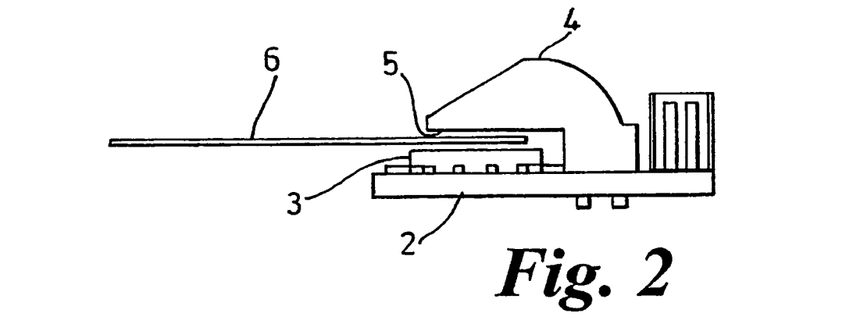
FIG. 2 is a cross-section of the sensor of FIG. 1.
Figure 3:
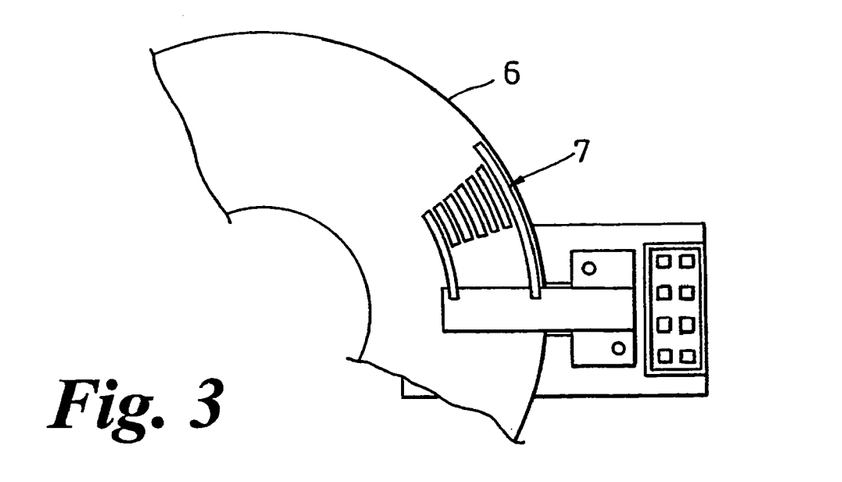
FIG. 3 is a plan view of the sensor illustrated in FIG. 1.

The angular position sensor illustrated in FIGS. 1 to 3 of the accompanying drawings is intended for use with an electric motor having a 3-phase star-connected brushless permanent magnet (PM) configuration. Specifically, the electromagnetic design of the motor includes a 6-pole permanent magnet rotor and 9-slot copper-wound stator. The magnetic poles are generally evenly spaced around the rotor. As the rotor rotates through one complete mechanical revolution there are six PM north-south pole transitions seen at any point on the stator. Importantly, the motor passes through three complete electrical revolutions in each complete mechanical revolution. Within each electrical revolution six commutations are required which occur at 60 degrees electrical (20 degrees mechanical) intervals. As will be shown in the following text, a sensor assembly is provided which has 18 absolute encoder transitions and 512 incremental encoder transitions over a full motor revolution.

The motor is intended for use in an electric power steering system for a vehicle. To provide accurate control of the motor an angular position sensor is required which will identify the commutation points of the motor. This allows the correct voltages to be applied to the motor phases. For motor control an angular position signal which has six output values—one value for each of the six commutations needed in an electrical revolution—is needed.

For increased control of the steering system it would also be advantageous for the angular position sensor to indicate which electrical revolution the motor is on, and also to provide a higher degree of accuracy than that provided by a sensor whose output only changes at the commutation points. The angular position sensor of the present invention has been developed to meet, in at least one embodiment, all of these requirements.

As shown in FIG. 1, the angular position sensor in accordance with the present invention comprises a combination of a three bit (three channel) absolute encoder and an incremental encoder integrated into a single sensing unit 1. Each encoder produces its own output signals which are combined together in a processing unit provided on an ASIC 2 to provide an enhanced functionality from the sensor as a whole. It is notable that both the detectors of the absolute and incremental encoders and the processing circuitry are provided on a single piece of silicon.

The two encoder units are combined into a single detection head 3 which is mounted onto the ASIC. A light source in the form of a light emitting diode (not shown) is also mounted on the board and transmits light along a light pipe 4, which is emitted from an end 5 of the pipe 4 towards the detection head 3.

A modulating mask 6 is attached to the rotor whose angle is to be measured such that a segment of the mask is interposed between the head of the pipe 4 and the detection head 3. The mask 6 carries seven concentrically arranged annular tracks 7 of encoding elements. As the rotor is rotated the mask 6 also rotates.

The detection head 3 comprises a total of ten photo detectors. Each detector is adapted to co-operate with one of the annular tracks 7 on the mask 6 to produce a respective intermediate output signal.

Six of these detectors are arranged as three pairs and define the sensing portion of an absolute encoder. Each of these detectors is separated from the end of the light pipe by a respective encoding track. Thus, the absolute encoder is provided with three pairs of tracks—and hence detectors—being used to produce a single output channel for the absolute encoder.

The remaining four detectors form the sensing portion of an incremental encoder. A single incremental encoder track is provided having 128 equal width and equally spaced apertures which define arcuate encoding elements. Adjacent apertures are separated by opaque lands of equal width.

Two of the four detectors of the incremental encoder are arranged relative to the disk to provide inverting and non-inverting intermediate output signals to give two equally spaced transitions as the encoding elements of the incremental track pass the detectors as the encoder disk rotates.

The remaining two detectors similarly provide an inverting quadrature and a non-inverting quadrature output signal as the disk rotates and are arranged to give a further two transitions spaced equally between the phase transitions.

Figure 8:
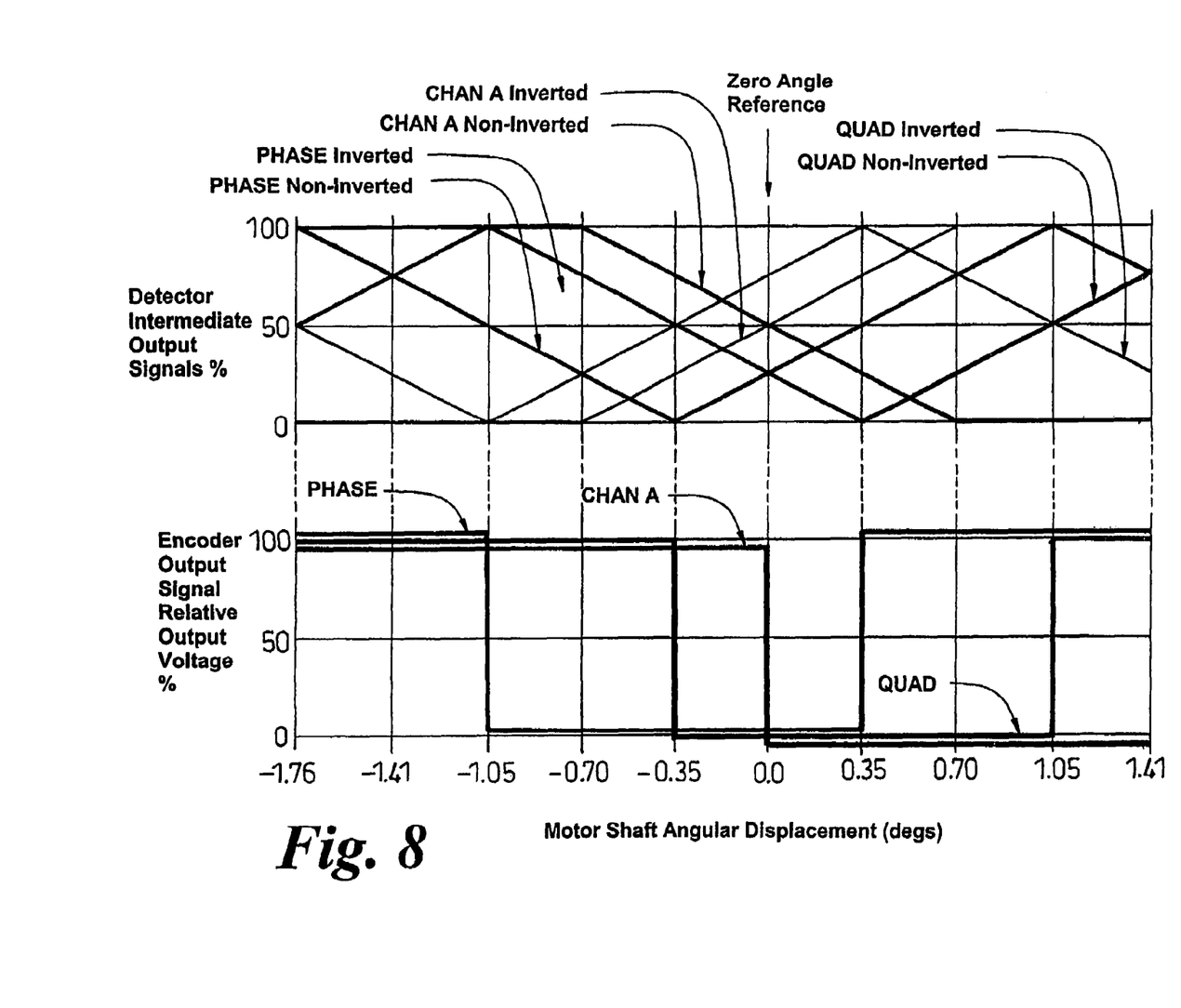
FIG. 8 shows typical waveforms at an absolute encoder transition.

The four detectors of the incremental encoder therefore provide four transitions per incremental encoder track period giving 512 transitions per mechanical revolution. FIG. 8 shows a typical output signal from the four detectors, and the phase/quad signals that are derived from them.

Figure 6:
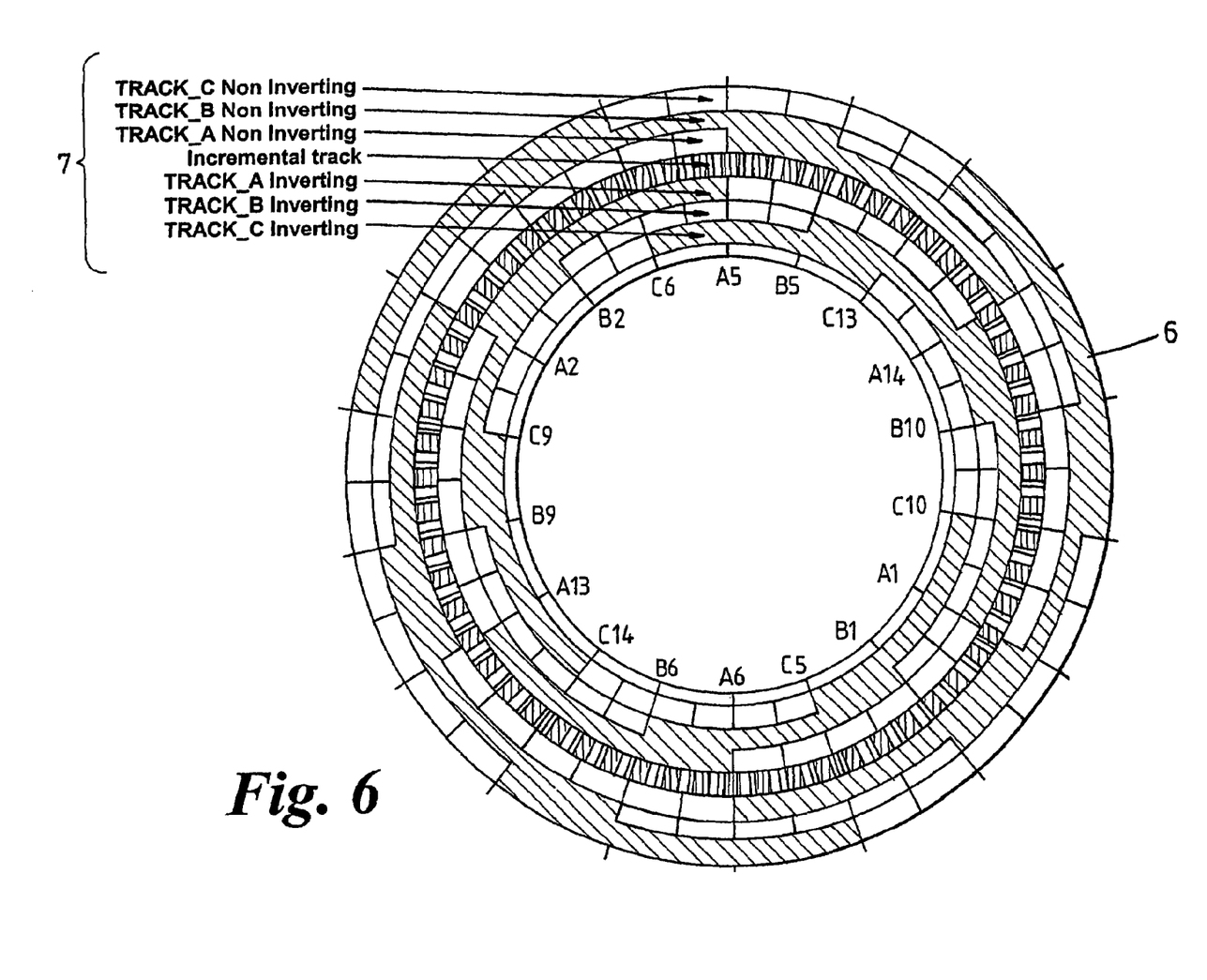
FIG. 6 illustrates the arrangement of the encoding elements making up each of the eight tracks of the mask that define six absolute and two combined relative encoder tracks.

The six tracks of the absolute encoder and the single track of the incremental encoder are arranged concentrically about the axis of rotation of the mask. This can be seen in FIG. 3 and in more detail in FIG. 6 of the accompanying drawings. Each track comprises an annular set of apertures provided in the opaque mask. The tracks are arranged in three pairs. One track of each pair is the inverse pattern of the other so that a pair of detectors working from the two tracks produces an inverting and a non-inverting intermediate output signal. These two intermediate signals are combined to produce a single channel of the first output signal from the absolute encoder. As there are three pairs of tracks—and three pairs of detectors—this results in a three channel absolute position output signal which is shown in FIG. 7 of the accompanying drawings. It is notable that the output signal pattern repeats three times over a complete mechanical revolution so it is not possible from this three channel information alone to unambiguously determine the mechanical position of the rotor. Of course, other patterns of apertures may be used if desired.

Although many patterns of encoding elements may be employed, as shown in FIG. 7 the pattern used in this example provides the following sequence of output signal values from each pair of inverting and non-inverting detectors to be produced as the encoder disk rotates over a mechanical revolution:

| Track: | | |
| --- | --- | --- |
| A | B | C |
| 0 | 0 | 1 |
| 0 | 1 | 1 |
| 0 | 1 | 0 |
| 1 | 0 | 0 |
| 1 | 1 | 0 |

-continued

| Track: | | |
| --- | --- | --- |
| A | B | C |
| 1 | 0 | 0 |
| 1 | 0 | 1 |

This pattern repeats three times over a complete mechanical revolution. An output value of 1 from a channel corresponds to a non-inverting detector of that channel being fully covered by an encoder aperture and its corresponding inverting detector being fully covered by an opaque region. Conversely, a value of zero corresponds to a non-inverting detector being fully covered by an opaque region and its inverting detector being fully covered by an aperture. Of course, as the disk rotates then there will be points at which the detectors are only partially covered which causes the intermediate outputs from the pairs of detectors of a channel to vary linearly between zero and one or vice versa. This is also shown in FIG. 8 of the accompanying drawings for a single absolute encoder channel A. The midpoint where the inverting and non-inverting outputs cross is taken as the transition point for the state of each channel.

The single incremental encoder track comprises a set of arcuate windows with equal width opaque regions between them. The apertures of one track are aligned one quarter of a period out of phase with the other. As stated hereinbefore the track co-operates with four detectors, which are circumferentially spaced by one half of a period. This is illustrated in FIG. 4 of the accompanying drawings.

The output signals from each pair are combined to produce a triangular position signal which varies as the mask rotates. In the example considered especially useful by the applicant each of the incremental encoder tracks provides 128 windows giving 512 edge transitions over a complete revolution. This can be seen for approximately one period of the incremental encoder output in FIG. 8 of the accompanying drawings.

By counting the number of transitions of the incremental output signal since a transition in the state of the output of the absolute position sensor movement of the rotor can be accurately determined.

Figure 4:
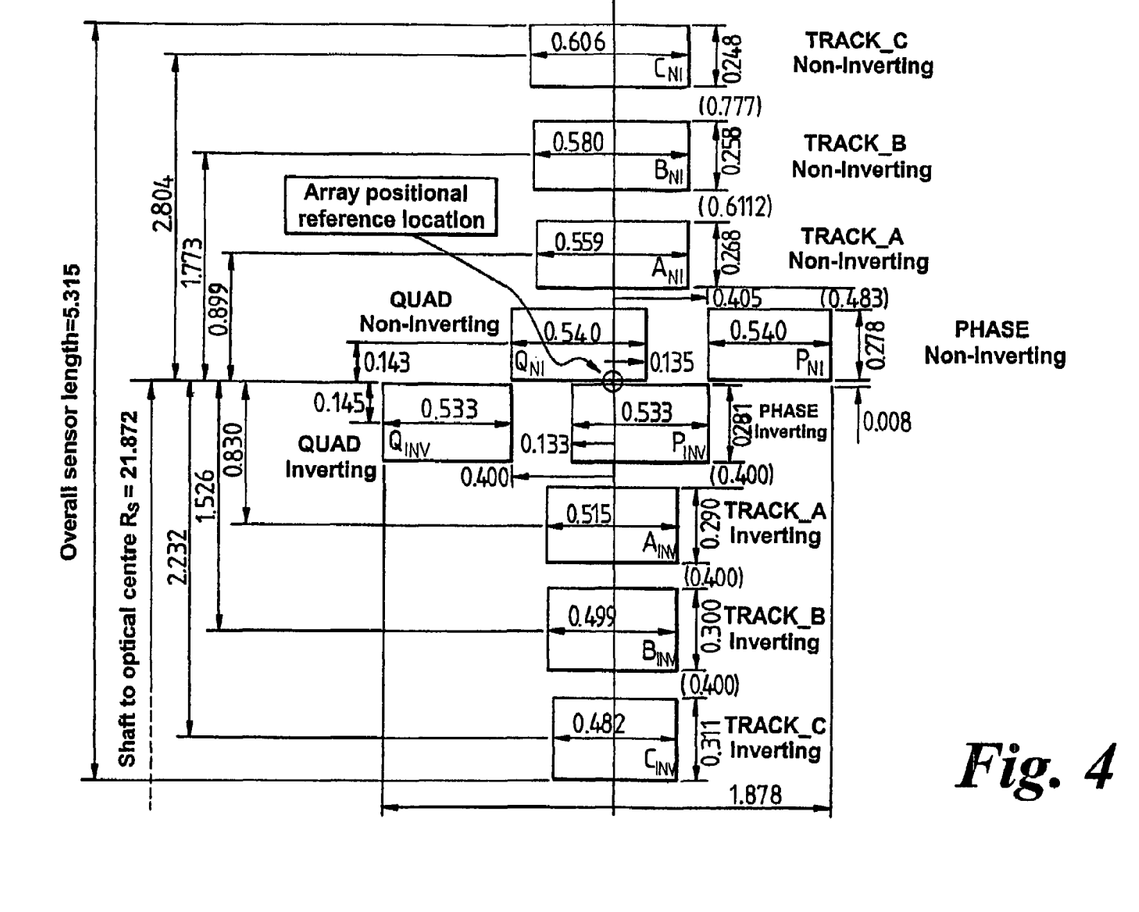
FIG. 4 is a plan view of the layout of the detectors relative to their encoding tracks in the sensor of FIG. 1.

The arrangement of the ten detectors is shown in the plan view of the sensing head in FIG. 4 of the accompanying drawings. The six detectors of the absolute encoder are arranged in a line which is aligned with a radius of the mask. The two pairs of detectors of the incremental encoder are spaced circumferentially relative to the mask with one detector of each pair arranged to either side of the line connecting the detectors of the absolute encoder. All ten detectors are provided as regions of a common substrate to ensure that the detectors are accurately aligned relative to one another.

The order in which the heads are arranged is of significance in this embodiment (although other orders could be used if desired). In particular it is notable that the heads which correspond to the tracks with the shortest period are provided nearer to the centre of the set. The tracks with the longest period are provided at the outermost and innermost positions. Also, the tracks of each pair of detectors are arranged in opposite positions on either side of the central tracks. This arrangement helps to minimise the effects of yaw of the detectors relative to the mask.

Figure 5:
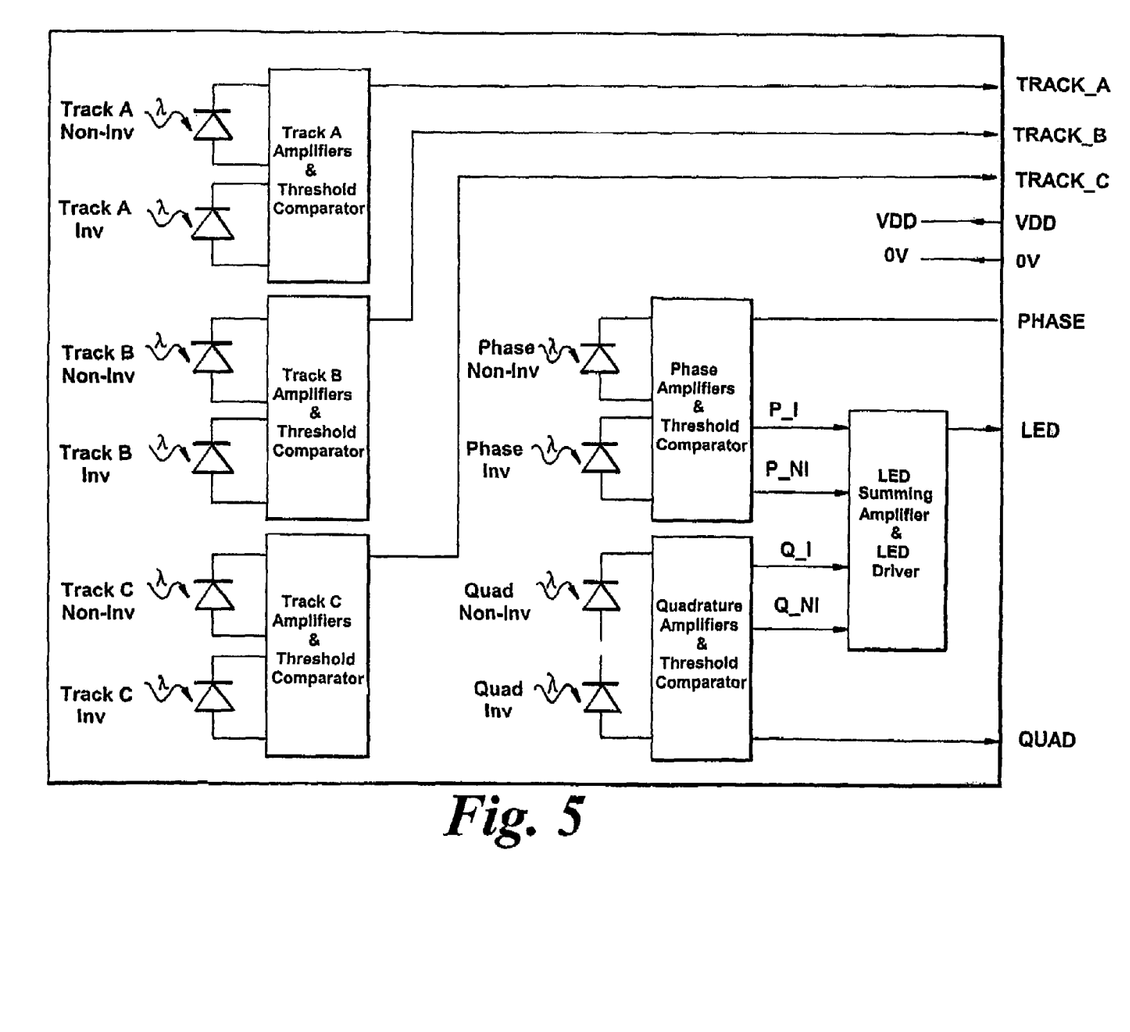
FIG. 5 is schematic illustration of an electronic circuit which is incorporated into the sensor of FIG. 1 for the processing of output signals from the detectors.

Providing the tracks and the detectors in the arrangement shown in FIG. 5 provides a relatively high degree of tolerance to yaw placement errors and disk run-out. For the scheme to function correctly it is important that:

1) The rate of change in percentage of detector masked by a given encoding element must be the same for the non-inverting and the inverting elements for all tracks for a given change in motor shaft angle (i.e. as the disk is rotated); and
2) The rate of change in percentage of detector masked by a given encoding element must be the same for the non-inverting and the inverting elements for all tracks for a given change in sensor yaw angle.

Point 1 is satisfied by varying the width of the detectors such that those nearest the axis of the mask have a narrower width than those farther from the axis of the mask. Also, the detectors are provided with decreasing lengths (radially) moving out from the axis of the mask. This means that the aspect ratios of the detectors differ to maintain equal changes in sensitivity for each detector of an inverting/non-inverting pair.

A further notable feature is that the gaps between the innermost detectors are equal to twice the expected mask run out whilst the gap between the outermost detectors is greater than twice the run out. Of course, this may be varied in other applications if desired.

An example of a circuit which can be used to process the intermediate output signals from the ten detectors is shown in FIG. 5 of the accompanying drawings. Each of the detectors produces a signal which varies between a minimum voltage (typically 0 volts) and a maximum voltage. The maximum will usually correspond to saturation of the detector. The value of the output will depend on the amount of light received by the detector. This is turn depends on whether an opaque section of the mask or a window is located between the light source and a detector. It is therefore clear that the choice of the pattern of windows around a track determines the output of each detector as the mask rotates.

Each of the outputs is fed to an amplification and processing circuit. For each pair of detectors in the absolute sensor corresponding to a channel (A,B or C) one detector works with a track having a pattern that is an inverse of the pattern for the track that the other detector works with. Thus, for any given position of the mask one track of a pair will allow a maximum amount of light onto the detector whilst the other blocks all light or vice versa. This use of a pair of tracks allows the outputs of the two detectors to be combined to produce a value that is independent of variations in the intensity of the light source over time.

The provision of the absolute and incremental encoders in a single device also enables a signal to be provided which indicates the absolute mechanical angle of the rotor.

Using the output of the absolute encoder alone, a given transition in the output signal (say in change in channel A from 101 to 001) may mean that the rotor is at any one of three precise positions. To determine which position it is in the value of the incremental encoder signals either side of the transition can be checked. Careful alignment of the incremental encoder tracks relative to the absolute encoder edges enables each of the three transitions to be associated with a unique set of incremental encoder values. In actual fact, as the incremental encoder can have any one of four values (00, 01,10 or 11) either side of a transition there is a degree of redundancy present in the system.

Figure 7A:
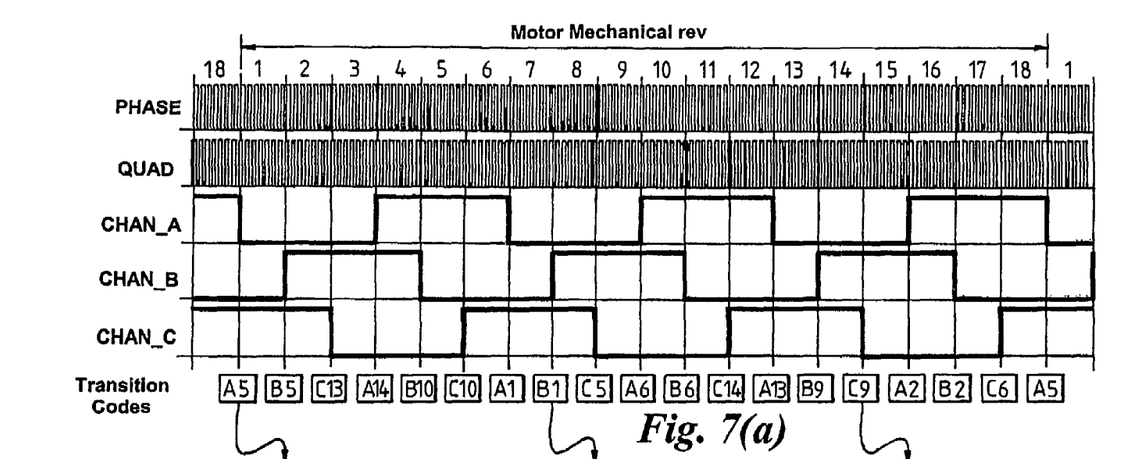
Figure 7B:
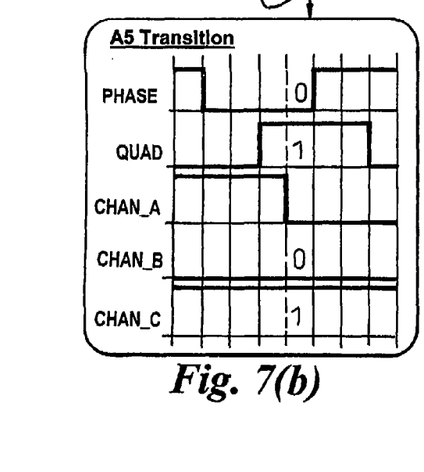
Figure 7C:
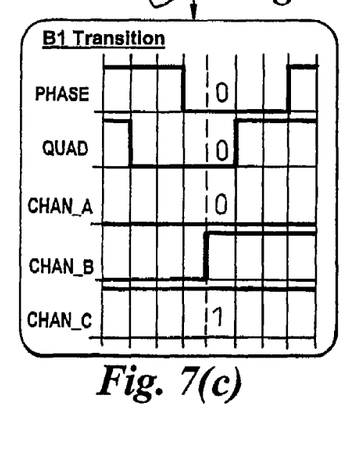
Figure 7D:
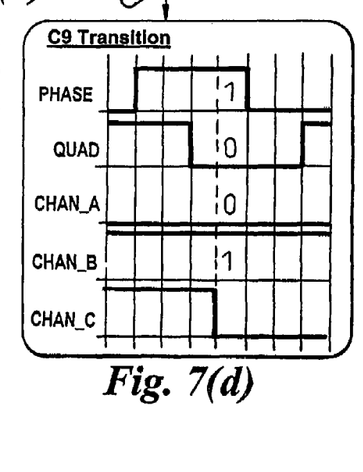

A list of the ideal against actual angles is provided in the following table. It is notable that each of the 18 absolute transitions is uniquely identifiable by looking at the two output signals from the incremental encoder and the two output signals from the two remaining encoder tracks. Examples of these typical transitions (one from each of channel A,B and C) are given in FIGS. 7(b), (c) and (d) respectively.

It will be appreciated that the exact location of the absolute encoder transitions deviates slightly from an ideal position in which they align perfectly with the commutation points in this example. In practice, such a slight shift will have a negligible effect on any motor control strategy which uses information from such a sensor. The amount of misalignment needed being relatively small.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

Table of encoder transition states
Possible Motor Position Encoder Transitions
X denote TRACK A, B or C transitions—Transition polarity will depend on direction of rotation
Transition numbers are given by the residue of the PHASE, QUAD and TRACK states once the changing track has been omitted.
9-6 Motor Encoding

| Commutation state No | PHASE State | QUAD State | TRACK A State | TRACK B State | TRACK C State | Actual Angle (degs) | Measured Angle (degs) | Angular error (degs) | Transition Codes Track Number | Possible Transitions Numbers | | Impossible Transitions Numbers | |
|---|---|---|---|---|---|---|---|---|---|---|---|---|---|
| 1 | 0 | 1 | X | 0 | 1 | 0 | 0.00 | 0.00 | A 5 | 0001 | 1 | 0000 | 0 |
| 2 | 0 | 1 | 0 | X | 1 | 20 | 19.69 | −0.31 | B 5 | 0010 | 2 | 0011 | 3 |
| 3 | 1 | 1 | 0 | 1 | X | 40 | 40.08 | 0.08 | C 13 | 0101 | 5 | 0100 | 4 |
| 4 | 1 | 1 | X | 1 | 0 | 60 | 59.77 | −0.23 | A 14 | 0110 | 6 | 0111 | 7 |
| 5 | 1 | 0 | 1 | X | 0 | 80 | 80.16 | 0.16 | B 10 | 1001 | 9 | 1000 | 8 |
| 6 | 1 | 0 | 1 | 0 | X | 100 | 99.84 | −0.16 | C 10 | 1010 | 10 | 1011 | 11 |
| 7 | 0 | 0 | X | 0 | 1 | 120 | 120.23 | 0.23 | A 1 | 1101 | 13 | 1100 | 12 |
| 8 | 0 | 0 | 0 | X | 1 | 140 | 139.92 | −0.08 | B 1 | 1110 | 14 | 1111 | 15 |
| 9 | 0 | 1 | 0 | 1 | X | 160 | 160.31 | 0.31 | C 5 | | | | |
| 10 | 0 | 1 | X | 1 | 0 | 180 | 180.00 | 0.00 | A 6 | | | | |
| 11 | 0 | 1 | 1 | X | 0 | 200 | 199.69 | −0.31 | B 6 | | | | |
| 12 | 1 | 1 | 1 | 0 | X | 220 | 220.08 | 0.08 | C 14 | | | | |
| 13 | 1 | 1 | X | 0 | 1 | 240 | 239.77 | −0.23 | A 13 | | | | |
| 14 | 1 | 0 | 0 | X | 1 | 260 | 260.16 | 0.16 | B 9 | | | | |
| 15 | 1 | 0 | 0 | 1 | X | 280 | 279.84 | −0.16 | C 9 | | | | |

-continued

Table of encoder transition states
Possible Motor Position Encoder Transitions
X denote TRACK A, B or C transitions—Transition polarity will depend on direction of rotation
Transition numbers are given by the residue of the PHASE, QUAD and TRACK states once the changing track has been omitted.
9-6 Motor Encoding

| Commutation state No | PHASE State | QUAD State | TRACK A State | TRACK B State | TRACK C State | Actual Angle (degs) | Measured Angle (degs) | Angular error (degs) | Transition Codes Track Number | Possible Transitions Numbers | Impossible Transitions Numbers |
|---|---|---|---|---|---|---|---|---|---|---|---|
| 16 | 0 | 0 | X | 1 | 0 | 300 | 300.23 | 0.23 | A 2 | | |
| 17 | 0 | 0 | 1 | X | 0 | 320 | 319.92 | −0.08 | B 2 | | |
| 18 | 0 | 1 | 1 | 0 | X | 340 | 340.31 | 0.31 | C 6 | | |

8 codes at 3 Hall line transitions gives 24 possible unique transition identifiers. Only 18 are used for the 9-6 motor
The following 6 codes are not required: A9, A10, B13, B14, C1 and C2
Max angular error = 0.31 degs
Min angular error = −0.31 degs

The invention claimed is:

1. An angular position sensor suitable for use in combination with the rotor of an electrical motor comprising:
   an absolute angular position encoder having a plurality of tracks of encoder elements and producing a first output signal having a period corresponding to an electrical revolution of said motor and less than a mechanical revolution of said rotor, said first output signal from said absolute position encoder changing state at a plurality of predetermined transition points within a period;
   an incremental encoder having at least one track of encoder elements and producing a second output signal which varies periodically over a complete revolution of said rotor; and
   a common encoding mask including encoder tracks of each of said absolute and incremental encoders that comprise annular sets of tracks of encoding elements with which said absolute angular position encoder and said incremental encoder are constructed and arranged so that said first output signal from said absolute encoder and said second output signal from said incremental encoder provide sufficient information to produce a third output signal indicative of the absolute mechanical position of said rotor.

2. The angular position sensor of claim 1 wherein, to produce said third output signal, said first output signal is a multi-state signal having different states on either side of a transition in said first output signal which, when combined with the state of said second output signal at the point of said transition, are arranged to provide a unique combination for every transition of said first output signal over a complete mechanical revolution.

3. The angular position sensor of claim 2 wherein said first output signal comprises a three channel signal with each channel being able to adopt one of two states such that a total of eight unique states can be represented across said three channels.

4. The angular position sensor of claim 2 wherein said first output signal cycles through all, or a subset of, said different states across a single period which corresponds to a complete electrical revolution of said motor.

5. The angular position sensor of claim 4 wherein said cycle is repeated for each electrical revolution in a complete mechanical revolution.

6. The angular position sensor of claim 1 wherein the state of said second output signal is arranged to be the same immediately before and after a transition of said first output signal.

7. The angular position sensor of claim 6 wherein said second output signal is arranged to have at least as many possible states as there are electrical revolutions of said motor across one full mechanical revolution.

8. The angular position sensor of claim 1 wherein each transition in the state of said first output signal of said absolute encoder is aligned with a respective commutation point of said motor.

9. The angular position sensor of claim 8 wherein said motor has a number of communications over a complete revolution and said output signal from said absolute encoder has a number of possible states which is equal to or greater than said number of commutations of said motor over an electrical revolution.

10. The angular position sensor of claim 9 wherein the angular position of said transitions in said state of said first output signal of the absolute position sensor is offset slightly relative to said communications of said motor to ensure that a unique combination of absolute and incremental encoder values occurs for each transition within a mechanical revolution.

11. The angular sensor position of claim 10 wherein said transitions in said first output signal are offset from said commutation, by less than one period of said second output signal of said incremental encoder.

12. The angular position sensor of claim 1 wherein at least one of said first output signal and said second output signal comprise signals having stepped changes in value.

13. The angular position sensor of claim 1 wherein said second output signal from said incremental encoder is periodic and a period of said second output signal is less than a period between transitions in said state of said first output signal from said absolute position encoder.

14. The angular position sensor of claim 1 wherein said absolute encoder produces a multi-state first output signal, having a number of states over an electrical revolution which is not less than the number of commutation points within one electrical revolution of said motor that is being monitored by said sensor.

15. The angular position sensor of claim 14 wherein said first output signal has insufficient states to represent a unique value for every commutation within a complete mechanical revolution.

16. The angular position sensor of claim 1 wherein a multiple bit Gray code is used for said first output signal such that, as said rotor rotates, only one bit of said first output signal changes at each transition across an electrical revolution.

17. The angular position sensor of claim 1 wherein each of said absolute encoder tracks have a pattern which is the same, with at least one track out of phase with the other tracks.

18. The angular position sensor of claim 1 wherein said encoding elements comprise apertures in said encoding mask and a source of radiation is provided on one side of the mask with a detector provided on the other side such that a region of said encoding track is interposed between said source and said detector.

19. The angular position sensor of claim 1 wherein said encoding mask includes at least one track of reflective and non-reflective regions with a source of radiation and a detector located on the same side of said mask.

20. The angular position sensor of claim 18 wherein at least one detector is provided for each track of said mask.

21. The angular position sensor of claim 20 each detector produces an intermediate output signal, and intermediate output signals of at least two of said detectors are combined to produce at least one of said first output signal and said second output signal.

22. The angular position sensor of claim 1 wherein said incremental encoder employs at least one encoding track, with at least two detectors arranged such that one of said detectors produces a phase output signal and another of said detectors produces a quadrature output signal as said encoding mask rotates.

23. The angular position sensor of claim 22 wherein each pair of said phase and quadrature detectors are duplicated to produce non-inverting and inverting intermediate output signals, which are compared to give a digital edge transition corresponding to the point at which said output signals cross-over.

24. The angular position sensor of claim 22 wherein each detector has a width and said width of each detector associated with the incremental track is equal to the angular width of the elements of the incremental track so that each detector produces a triangular output signal waveform as the disk rotates at a constant speed.

25. The angular position sensor of claim 18 wherein said encoding mask is a disk having a center and said detectors are so constructed and arranged that the fractional area of track swept across each detector by a region of the encoding disk is the same for each detector.

26. The angular position sensor of claim 25 wherein each detector subtends the same angle about said center of said disk and has the same radial width.

27. The angular position sensor of claim 18 wherein said detectors are spaced by a distance that is at least twice a maximum expected run-out of said encoding disk.

28. The angular position sensor of claim 1 wherein each encoding element comprises an arcuate element extending between two radii extended from a center of said annular tracks, with a radial width of each detector not less than a radial width of said encoding elements associated with that detector.

29. The angular position sensor of claim 1 wherein two encoder tracks are provided for each bit of said first output signal of said absolute encoder with a respective detector for each track, and in which each of the pair of tracks comprises a pattern of encoding elements that produces a non-inverting and an inverting intermediate output signal from said detectors.

30. The angular position sensor of claim 29 wherein said non-inverting and inverting intermediate output signals are amplified, and a cross-over point at which a valve of said signals cross is detected using a voltage comparator to form a bit of said first output signal, with said cross-over point being used to indicate a transition of said absolute encoder value.

31. The angular position sensor of claim 29 wherein said tracks of said absolute angular position encoder and said relative angular position encoder comprise a plurality of concentric annular tracks of encoder elements arranged concentrically on an encoder mask such that along a radius of said encoder mask-said inverting and non-inverting tracks corresponding to each bit of said absolute angular position encoder are provided on opposite sides of the track of said relative angular position encoder.

32. The angular position sensor of claim 31 wherein, denoting each pair of absolute encoder tracks as A,B,C and a single incremental track INC, said absolute tracks being labeled as $A_{inv}$, $A_{non-inv}$, $B_{inv}$, $A_{inv}$, $B_{non-inv}$, $C_{inv}$, $C_{non-inv}$ and said incremental track INC, said tracks are arranged in the following order moving away from the center of said encoder mask:

$$C_{non-inv}, B_{non-inv}, A_{non-inv}, INC, A_{inv}, B_{inv}, C_{inv}.$$

33. The angular position sensor of claim 28 wherein the detectors of a pair of non-inverting and inverting channels are arranged so that for a sensor array having a given yaw angle an increase in the swept area of a detector of an inverting channel covered by one encoding element that partially covers that detector as a fraction of the total active area of that detector is the same as a decrease in swept area of said non-inverting channel covered by one encoding element that partially covers that detector as a fraction of the total active area of that detector, compared with a sensor array having zero yaw angle.

34. The angular position sensor of claim 1 wherein said encoders are both optical encoders, comprising a source comprising a light source and each detector comprising a photodetector, provided on a common substrate.

35. The angular position sensor of claim 34 wherein said photodetectors are formed on a single piece of semi-conductor which also carries a processing circuitry used to produce said first and second output signals from output signals produced by said photodetectors.

36. The angular position sensor of claim 1 wherein, each encoder has a generally rectangular active detecting area.

37. The angular position sensor of claim 29 wherein a radial height of a detector is less than a radial height of said encoding elements of said encoder track with which it corresponds.

38. The angular position sensor of claim 31 wherein said detectors have increasing widths the further they are from the axis of rotation of said encoder.

39. The angular position sensor of claim 38 wherein said detectors have decreasing lengths moving away from an axis of said encoder mask.

* * * * *